United States Patent [19]
Tchang

[11] 3,761,827
[45] Sept. 25, 1973

[54] SWITCHING DEVICE FOR MEASURING ELECTRICAL CURRENTS AND VOLTAGES

[75] Inventor: Gabriel A. A. Tchang, Stockholm, Sweden

[73] Assignee: Siemens Aktiengesellschaft, Erlangen, Germany

[22] Filed: Nov. 22, 1971

[21] Appl. No.: 200,694

[30] Foreign Application Priority Data
Dec. 5, 1970 Germany............. P 20 59 924.0

[52] U.S. Cl............. 328/105, 307/235 R, 307/242, 307/269, 328/147, 328/153
[51] Int. Cl........................... H03k 5/18, H03k 5/20
[58] Field of Search.................. 307/235, 232, 240, 307/242, 243, 261, 265, 268, 269, 271; 328/63, 75, 104, 115–117, 119, 135, 145, 147–149, 150, 152, 154; 324/123

[56] References Cited
UNITED STATES PATENTS

| | | | |
|---|---|---|---|
| 3,278,851 | 10/1966 | Damon, Jr. et al. ......... | 307/235 A X |
| 2,762,978 | 9/1956 | Norton............................ | 328/148 X |
| 3,076,144 | 1/1963 | Blasbalg........................... | 328/147 |
| 3,076,933 | 2/1963 | Negrete .......................... | 328/147 X |
| 3,219,842 | 11/1965 | Greunke et al. ................... | 307/235 |
| 3,255,417 | 6/1966 | Gottlieb.............................. | 328/145 |
| 3,387,222 | 6/1968 | Hellwarth et al. ................ | 307/235 X |
| 3,482,115 | 2/1969 | Kahn et al. ..................... | 328/145 X |
| 3,508,158 | 4/1970 | Marchese........................ | 328/147 X |
| 3,579,125 | 5/1971 | Lindblad et al.................. | 307/235 X |

Primary Examiner—John W. Huckert
Assistant Examiner—L. N. Anagnos
Attorney—V. Alexander Scher et al.

[57] ABSTRACT

A switching device is used for measuring electrical voltages and/or currents or their differences, particularly for measured values produced in the photometry from tests and comparative tests. The invention is particularly characterized in that values which are to be measured or compared are transformed into a sequence of impulses consisting of impulses following each other alternately in time sequence and having amplitudes corresponding to the measured values. The sequence of impulses, possibly after amplification, is further treated in two separate channels. The treatment consists in that when an impulse of the sequence is present which corresponds to one measured value in one or the other channel, the potential of the impulse sequence in that channel is shifted in the same direction by the corresponding amplitude value. The impulse sequences thus shifted are transmitted to a difference former.

8 Claims, 2 Drawing Figures

SWITCHING DEVICE FOR MEASURING ELECTRICAL CURRENTS AND VOLTAGES

This invention relates to a switching device for measuring electrical voltages and/or currents, or their differences, particularly for measured values produced in the photometry from tests and comparative tests.

Measuring currents produced in photometry are in the range of tenths of microamperes. There small currents can be amplified and then compared. However, the outlets of switches used for this purpose do not produce the desired measured values in sufficient precision, since the measured signals after amplification mostly disappear due to errors or oscillations of amplifiers used for the individual measured values.

An object of the present invention is to improve existing constructions through the provision of a switching device by means of which it will be possible to measure and compare with sufficient precision even the small currents of the type used in photometry.

Other objects of the present invention will appear in the course of the following specification.

In the accomplishment of the objectives of the present invention it was found desirable to transform the values which are to be measured or compared into a sequence of impulses consisting of impulses following each other alternately in time sequence and having amplitudes corresponding to the measured values. The sequence of impulses, possibly after amplification, is further treated in two separate channels, in that when an impulse of the sequence is present which corresponds to one measured value in one or the other channel, the potential of the impulse sequence in that channel is shifted in the same direction by the corresponding amplitude value. The impulse sequences thus shifted are transmitted to a difference former.

Thus in accordance with the present invention small measured signals can be changed in a single common amplifier into easily treatable values, so that all mistakes are eliminated in the following difference formation. The measuring safety of the suggested switching arragement is very high also for the reason that the sequence of impulses of the impulses corresponding to individual measured values can be selected to be comparatively high (for example, 1 kHz), so that even quick changes of measured values can be securely absorbed.

However, the subject of the present invention can be used advantageously not only for measuring small electrical signals, but can be also effectively employed in cases where the measured values are only of short duration. The switching device of the present invention greatly simplifies the comparision of measured values appearing for only a short time, so that it attains measuring safety which is considerably better than that of prior art methods.

In accordance with an advantageous embodiment of the present invention a switch member actuated by a key giver is used to produce the sequence of impulses, the switch member keying the measured in time sequence alternately one after the other. The key frequency of the key giver can be adjusted. Thus the obtained frequency can be adapted in a simple manner to the measuring problem on hand and the speed of variations of the measured values can be taken into consideration. For measuring photometric values in case of blood pigment measuring the key frequency is preferably in the range of $kH_z$.

To avoid excessive dead time periods the ratio between pulse duration and pause duration should be greater than one, preferably 3:1. The duration of impulses corresponding to the individual measured values is preferably the same.

Amplification of the impulse sequence takes place preferably by a logarithmically operating amplifier. In this manner disturbing voltages superposed upon the impulse amplitudes, particularly the sound voltages of the amplifier, are dampened to such an extent that they actually do not influence any more the measured results. Disturbing voltages taking place during the pulse pauses have no significance since they are automatically eliminated in the following difference formation in the difference former.

According to a further development of the present invention a separate inlet condenser is provided in the channels for supplying the impulse sequence. Furthermore, each channel is provided with a change-over switch connected behind the corresponding inlet condenser and set to the zero line potential of the impulse sequence. An actuating device is also provided which switches a change-over switch when an impulse derived from a first measured value is present and which switches the other change-over switch when an impulse derived from a further measured value is present so as to connect the zero line potential to the corresponding channel. The proper actuation of the change-over switches by the actuating device can take place not only on the basis of a program set in time and operated by the key giver, but also by means of actuating signals which are derived from the impulse sequence itself, for example, by means of peak detectors. However, when the key giver is used for the operation, the proper adaptation of the operating signals actuated by the change-over switches to the corresponding impulses derived from the measured values is considerably simplified.

The invention will appear more clearly from the following detailed description when taken in connection with the accompanying drawings showing by way of example only, a preferred embodiment of the inventive idea.

Figure 1:
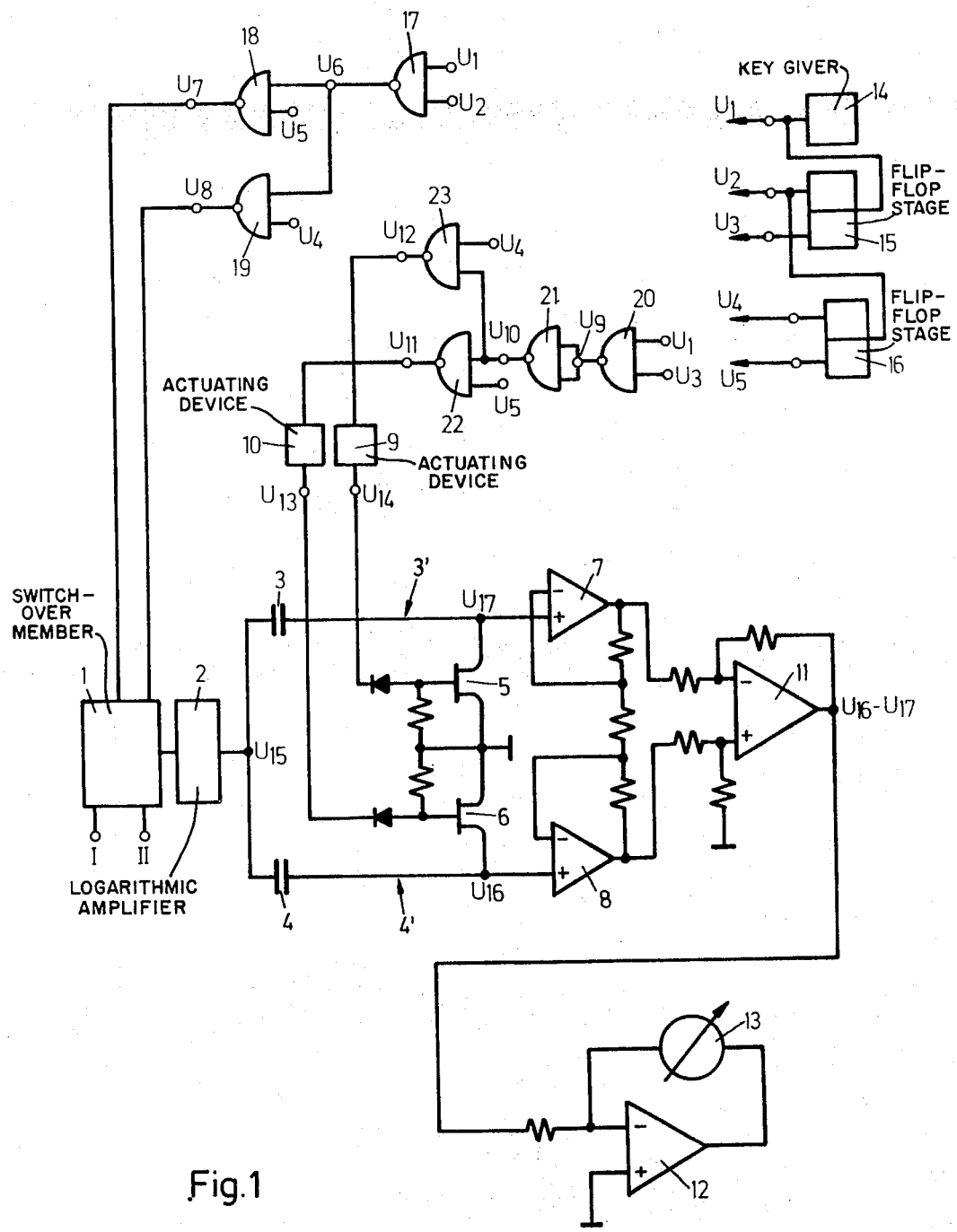
FIG. 1 is a diagram illustrating the main circuit of the device of the present invention.

FIG. 1 shows that measured values I and II produced, for example, in photometry from a test and a comparative test, are transmitted to a switch-over member 1 which transforms the measured values into an impulse sequence consisting of impulses following each other alternately spaced in time and having amplitudes corresponding to the measured values. The impulse sequence thus produced is amplified in a logarithmic amplifier 2 and has the shape of voltage $U_{15}$ in FIG. 2, whereby the impulse I is derived from the measured value I and the impulse II is derived from the measured value II. Thus the member 1 is an ordinary switch-over device which in rhythm of the measure producer alternately connects the inlets I or II to the inlet of the amplifier 2.

The impulse sequence $U_{15}$ is supplied to the inlet condensers 3 and 4 of the two treating channels 3' and 4' the electrodes of which, which are not connected with the outlet of the amplifier 2, can be switched alternately over field effect transistors 5 and 6 operating as change-over switches directly to the zero line potential of the impulse sequence $U_{15}$ (mass) or to the high ohmic non invertable inlets of an operation amplifier 7 or 8. The time periods during which the electrodes are directly connected with the mass, are fixed by opening impulses $U_{13}$ and $U_{14}$ produced by an actuating device 9, 10 for the transistors 5 and 6. During the switch-over the condenser electrodes remain connected with the amplifiers 7, 8. The devices 9 and 10 are producers of switch impulses, such as transistor switches.

A further operational amplifier 11 is connected behind the operational amplifiers working as impedance changers. The amplifier 11 forms the difference between the actual outlet voltages of the amplifiers 7 and 8. The actual present differential voltage is supplied to a closing operational amplifier 12 working as voltage-current changer and is transmitted to an indicating device 13 for indicating purposes.

The switching elements 17 to 23 are NAND gates which apply voltage impulses produced by a key giver 14 as well as by two flip-flop stages 15 and 16 to actuating signals for the proper actuation of the switch-over device 1 on the one hand and, on the other hand, to the actuating device 9, 10 for the change-over switches 5 and 6.

Figure 2:
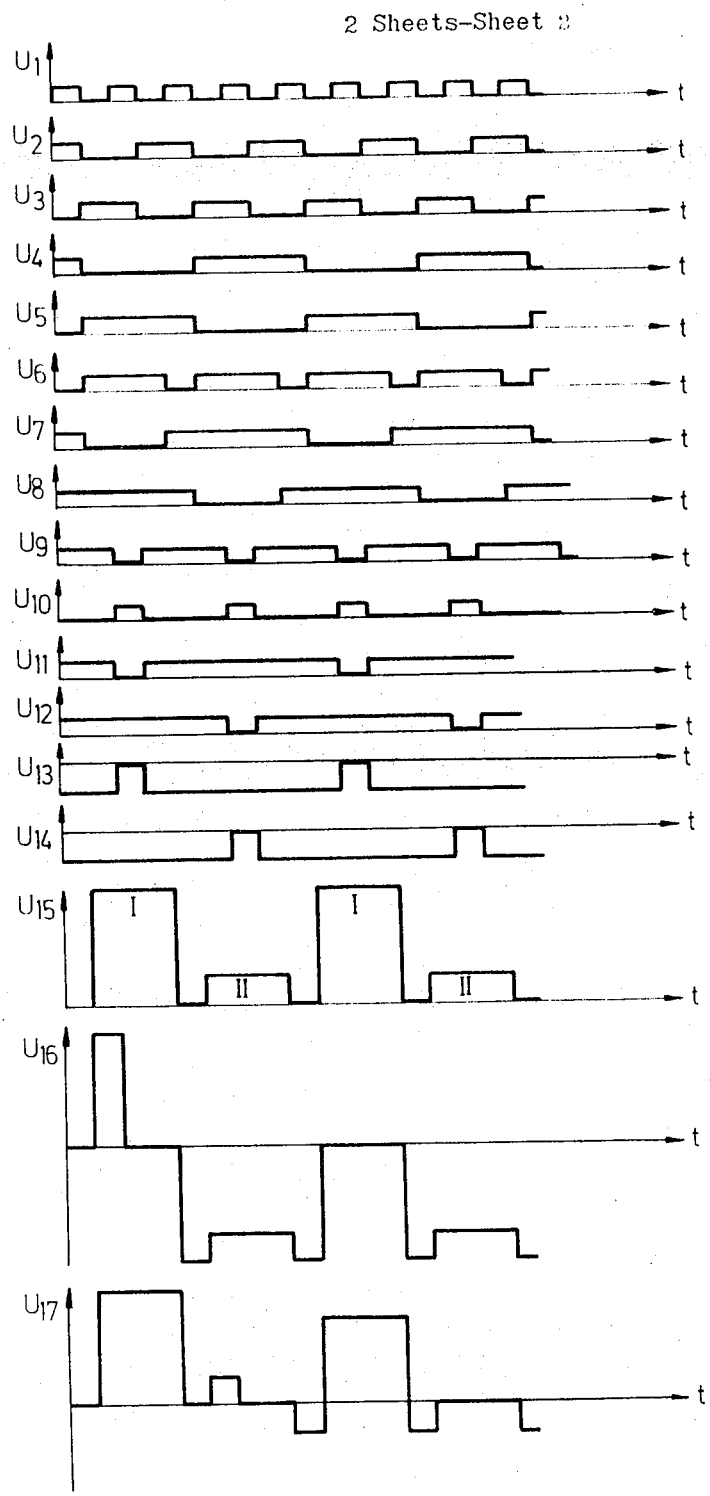
FIG. 2 is a diagram illustrating the passage of the voltages appearing at the important parts of the main circuit.

The operation of the device of the present invention as illustrated in FIGS. 1 and 2 is as follows:

The key giver 14 produces outgoing impulses $U_1(t)$ (impulse frequency being, for example 1 kHz), which are changed by the flip-flop stages 15 and 16 into impulse sequences $U_2(t)$ to $U_5(t)$. The key giver 14 is a normal voltage impulse producer, for example, an astable multivibrator. By combining voltages $U_1$ to $U_5$ in the NAND gates 17 to 19, voltages are produced at the outlets of members 18 and 19 the running of which corresponds to the curves $U_7(t)$ and $U_8(t)$ shown in FIG. 2.

The voltages $U_7$ and $U_8$ then actuate the switch-over member 1 in such manner that every time during the time period while the voltage $U_7$ is zero, the switch-over member 1 is switched to the measuring voltage I and thus during this time period the corresponding measuring value I is transformed into an impulse (I) having an amplitude corresponding to the measured value. Correspondingly, when the voltage $U_8$ passes through zero the switch-over member 1 is switched to the measured value II and during that time period an impulse (II) is produced with an amplitude corresponding to the measured value II.

Due to the logical combinations of the voltages $U_1$ and $U_3$ to $U_5$ in the members 20 to 23, outgoing voltages are produced in the members 22 and 23 the time extension of which is provided by impulse sequences $U_{11}(t)$ to $U_{12}(t)$ illustrated in FIG. 2. Every time that the voltage $U_{11}$ passes through zero, the field effect transistor 6 is opened and every time the voltage $U_{12}$ passes through zero the transistor 5 is open (outgoing voltages of the actuating device 9, 10 correspond to $U_{14}(t)$ and $U_{13}(t)$ in FIG. 2).

Therefore, incoming voltages $U_{16}$ and $U_{17}$ are produced at the non-inverted inlets of operational amplifiers 8 and 17, which correspond to voltage curves $U_{16}(t)$ and $U_{17}(t)$ shown in FIG. 2. Thus the voltages $U_{16}$ and $U_{17}$ are voltages which are automatically produced by the alternating switching of the right electrodes of the condensers 3 and 4 to zero potential by the switches 5, 6.

The difference voltage $U_{16}-U_{17}$ thus produced at the outlet of the operational amplifier 11 is also constant after the appearance of the first actuating impulse opening the transistor 5 when the measured values I and II are constant, and it corresponds precisely to the difference between the amplitudes of the impulses (I) and (II) of the impulse sequence $U_{15}(t)$. When the measured values I and II change, the difference voltage is changed corresponding to the newly appearing amplitude difference.

There are other switching elements consisting of resistances and diodes which are generally used for the dimensioning of operational amplifiers or switch transistors. Since these elements are well known in the art they are not described herein.

The switching device of the present invention is most suitable not only for measuring a single voltage or current (where reference value corresponds to the zero potential), but also for measuring the difference between two voltage or current values. By correspondingly changing the switching arrangement or the operating program, it is possible, if necessary, to examine more than two different voltages or currents. Then the number of operating channels can be increased corresponding to the number of voltages or currents to be treated, whereby all channels will be compared with each other in timely sequence by a corresponding program actuation. However, it is also possible to leave the two channel system and use a corresponding program actuation to supply only the measured impulses which are to be compared to the two channels, while the remaining ones are suppressed at the channel inlet.

I claim:

1. A device for measuring the difference between electrical voltages or currents derived from measured values, particularly in photometry, said device comprising transforming means transforming values which are to be compared into a single sequence of impulses consisting of impulses following each other alternately in time sequence and having amplitudes corresponding to the measured values, amplifying means connected to the output of said transforming means for amplifying said sequence of impulses, and circuit means connected to the output of said amplifying means, said circuit means comprising two separate treating channels for said sequence of impulses and a potential shifting device connected to each of said treating channels for shifting the potential of the whole impulse sequence in the one treating channel each time when an impulse corresponding to the one measured value is presented in said one channel to one direction by an amount corresponding to the amplitude of said one impulse and otherwise for shifting the potential of the whole impulse sequence in the other treating channel each time when an impulse corresponding to the other measured value is presented in said other channel to the same direction by an amount corresponding to the amplitude of said other impulse, and a difference former, connected to the outputs of that treating channels for producing the difference between the amplitudes of the so shifted one and other impulse sequence.

2. A device in accordance with claim 1, wherein each treating channel consists of an inlet condenser connected in series to the output of said amplifying means, and a high-ohmic impedance operational amplifier connected in series with said inlet condenser and wherein said potential shifting device comprises switching means connected to a point in the electrical line between said condenser and said high-ohmic impedance operational amplifier and being adapted to set the zero line potential to said point and further comprising a switch actuating device connected with the switching means of each channel and operable to switch the switching means of said one channel to connect the zero line potential to said one channel when an impulse derived from said one measured value appears in said one channel and to switch the other switching means of said other channel to connect the zero line potential to said other channel when an impulse derived from said other measured value appears in said other channel.

3. A device in accordance with claim 1, wherein said transforming means comprise a switch-over device and a multivibrator clock connected with and actuating said switch-over device, said switch-over device alternately testing the measured values one after the other.

4. A device in accordance with claim 3, wherein said transforming means further comprise means adjusting the clock frequency of said clock, said frequency for measuring photometric values being in the range of $kH_z$.

5. A device in accordance with claim 4, wherein the ratio between pulse duration and pause duration is greater than one, preferably 3:1.

6. A device in accordance with claim 5, wherein the duration of impulses corresponding to individual measured values is the same.

7. A device in accordance with claim 1, wherein in the case of photometry said amplifying means consists of a logarithmically operating amplifier.

8. A device in accordance with claim 3, wherein said switch actuating device is connected with and operated by said clock.

* * * * *